United States Patent
Sharma et al.

(10) Patent No.: US 9,531,745 B1
(45) Date of Patent: Dec. 27, 2016

(54) CROWD-SOURCED SECURITY ANALYSIS

(71) Applicant: International Business Machines Corporation, Armonk, NY (US)

(72) Inventors: Babita Sharma, Mississauga (CA); Richard Myer Goldberg, Thornhill (CA); Jeffrey Charles Turnham, Newmarket (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/946,810

(22) Filed: Nov. 20, 2015

(51) Int. Cl.
*H04L 29/06* (2006.01)
*G06F 17/27* (2006.01)
*G06F 21/62* (2013.01)

(52) U.S. Cl.
CPC ....... *H04L 63/1433* (2013.01); *G06F 17/2705* (2013.01); *G06F 21/6254* (2013.01)

(58) Field of Classification Search
None
See application file for complete search history.

(56) References Cited

U.S. PATENT DOCUMENTS

| | | | | |
|---|---|---|---|---|
| 8,572,735 B2* | 10/2013 | Ghosh | ............... | G06F 21/552 709/224 |
| 8,726,379 B1* | 5/2014 | Stiansen | ............ | H04L 63/1491 726/22 |
| 8,806,644 B1* | 8/2014 | McCorkendale | ... | H04L 63/1416 713/188 |
| 8,978,106 B2* | 3/2015 | Swamy | ................... | G06F 17/00 705/27.1 |

(Continued)

FOREIGN PATENT DOCUMENTS

EP 2575044 A1 4/2013

OTHER PUBLICATIONS

Yaseen, Qussai; Panda, Brajendra. Tackling Insider Threat in Cloud Relational Databases. 2012 IEEE Fifth International Conference on Utility and Cloud Computing. http://ieeexplore.ieee.org/stamp/stamp.jsp?tp=&arnumber=6424950.*

(Continued)

*Primary Examiner* — Jeremiah Avery
(74) *Attorney, Agent, or Firm* — Jeffrey S. LaBaw; David H. Judson

(57) ABSTRACT

A cloud-based static analysis security tool that is accessible by a set of application development environments is augmented to provide for anonymous knowledge sharing to facilitate reducing security vulnerabilities. To the end, a crowdsourcing platform and social network are associated with the application development environments. Access to the social network platform by users of the application development environments is enabled. The anonymous access enables users to post messages without exposing sensitive data associated with a particular application development environment. As the static analysis security tool is used, a knowledgebase of information regarding identified security findings, fix priorities, and so forth, is continuously updated. Social network content (e.g., in the form of analytics, workflow recommendations, and the like) is then published from the knowledgebase to provide users with security knowledge generated by the tool from the set of application development environments. The approach provides for secure and anonymous cross-organization information sharing.

21 Claims, 6 Drawing Sheets

(56) References Cited

U.S. PATENT DOCUMENTS

| | | | |
|---|---|---|---|
| 9,015,844 B1* | 4/2015 | Franklin | G06F 21/577 |
| | | | 713/165 |
| 2008/0189796 A1 | 8/2008 | Linn et al. | |
| 2009/0299812 A1* | 12/2009 | Ray | G06Q 10/10 |
| | | | 705/35 |
| 2010/0088364 A1 | 4/2010 | Carter et al. | |
| 2010/0205541 A1* | 8/2010 | Rapaport | G06Q 10/10 |
| | | | 715/753 |
| 2011/0302412 A1* | 12/2011 | Deng | H04L 63/0407 |
| | | | 713/159 |
| 2012/0231438 A1* | 9/2012 | Fakhrai | G09B 7/00 |
| | | | 434/350 |
| 2013/0097706 A1* | 4/2013 | Titonis | G06F 21/56 |
| | | | 726/24 |
| 2014/0013245 A1 | 1/2014 | Chi et al. | |
| 2014/0123295 A1* | 5/2014 | Kuykendall | G06F 21/577 |
| | | | 726/25 |
| 2014/0180780 A1 | 6/2014 | Stewart et al. | |
| 2014/0189808 A1* | 7/2014 | Mahaffey | H04L 63/0853 |
| | | | 726/4 |
| 2014/0201749 A1 | 7/2014 | Bao et al. | |
| 2015/0033340 A1 | 1/2015 | Giokas | |
| 2015/0121532 A1* | 4/2015 | Barel | G06F 21/577 |
| | | | 726/25 |

OTHER PUBLICATIONS

Dastjerdi, Amir Vahid; Bakar, Kamalrulnizam Abu; Gholam, Sayed; Tabatabaei, Hassan. Distributed Intrusion Detection in Clouds Using Mobile Agents. Third International Conference on Advanced Engineering Computing and Applications in Sciences. Pub. Date: 2009. http://ieeexplore.ieee.org/stamp/stamp.jsp?tp=&arnumber=5359505.*

Waqas, Ahmad; Yusof, Zulkefli Muhammed; Shah, Asadullah; Mahmood, Nadeem. Sharing of Attacks Information across Clouds for Improving Security: A Conceptual Framework. 2014 International Conference on Computer, Communications, and Control Technology (I4CT). http://ieeexplore.ieee.org/stamp/stamp.jsp?tp=&arnumber=6914185.*

* cited by examiner

CROWD-SOURCED SECURITY ANALYSIS

BACKGROUND OF THE INVENTION

Technical Field

This disclosure relates generally to identifying and remediating application vulnerabilities using static analysis tools.

Background of the Related Art

Today, most organizations depend on web-based software and systems to run their business processes, conduct transactions with suppliers, and deliver sophisticated services to customers. Unfortunately, many organizations invest little to no effort in ensuring that those applications are secure. Web-based systems can compromise the overall security of organizations by introducing vulnerabilities that hackers can use to gain access to confidential company information or customer data.

To address this deficiency, static analysis tools and services have been developed. Static security analysis (or "static analysis" for short) solutions help organization address web and mobile application vulnerabilities through a secure-by-design approach. This approach embeds security testing into the software development lifecycle itself, providing organizations with the tools they require to develop more secure code. Static analysis tools are often used by computer software developers to provide information about computer software while applying only static considerations (i.e., without executing a computer software application). Such tools simplify remediation by identifying vulnerabilities in web and mobile applications prior to their deployment, generating results (reports and fix recommendations) through comprehensive scanning, and combining advanced dynamic and innovative hybrid analyses of glass-box testing (run-time analysis, also known as integrated application security testing) with static taint analysis for superior accuracy. A representative commercial offering of this type is IBM® Security AppScan®, which enhances web application security and mobile application security, improves application security program management and strengthens regulatory compliance.

Typically, application analysis tools of this type are delivered to end users as traditional software packages, which the user is responsible for installing, configuring and maintaining. With this model, there are many obstacles to quickly and effectively incorporating security analysis into application development lifecycles. For example, prior to actually performing any security analysis, the user first needs to download and install the tool, address licensing and user management issues for the tool, and then understand where and how to integrate the functionality into existing build and development workflows. The user also has to have basic familiarity with the tool interface and how to configure the product for scanning. In addition to these basic challenges, additional obstacles often arise during use of the tool due to the sensitive nature of application security findings that the tool generates. In particular, because these findings can be used as a guide for a malicious user to attack an application, users typically are not willing to share security data, even with other teams in their own organization. This leads to several sub-optimal behaviors or outcomes, namely: little or no cross-team or cross-user collaboration on security analysis best practices or issue remediation, a lack of interaction or feedback loops between the user and the tool provider to help improve the analysis tool in terms of accuracy, performance or usefulness of the findings, as well as significant duplication of work, which occurs as many users scan the same source components.

BRIEF SUMMARY

A cloud-based static analysis security tool that is accessible by a set of application development environments is augmented to provide for anonymous knowledge sharing to facilitate reducing security vulnerabilities. To the end, a crowdsourcing platform and social network are associated with the application development environments. Access to the social network platform by users of the application development environments is enabled. The anonymous access enables users to post messages without exposing sensitive data associated with a particular application development environment. As the static analysis security tool is used, a knowledgebase of information regarding identified security findings, fix priorities, and so forth, is continuously updated. Social network content (e.g., in the form of analytics, workflow recommendations, and the like) is then published from the knowledgebase to provide users with security knowledge generated by the tool from the set of application development environments. The approach thus provides for secure and anonymous cross-organization information sharing.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
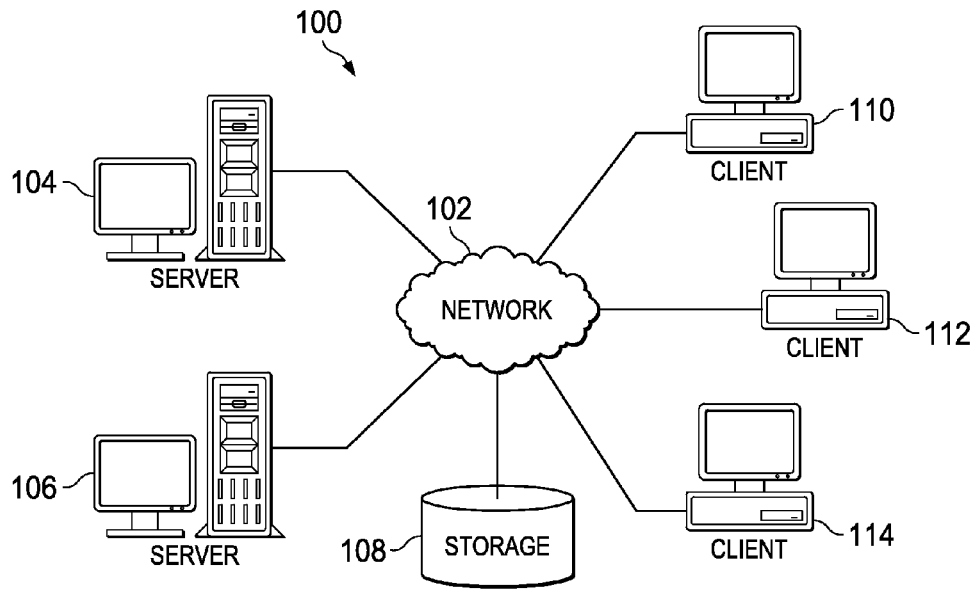
FIG. 1 depicts an exemplary block diagram of a distributed data processing environment in which exemplary aspects of the illustrative embodiments may be implemented.
Figure 2:
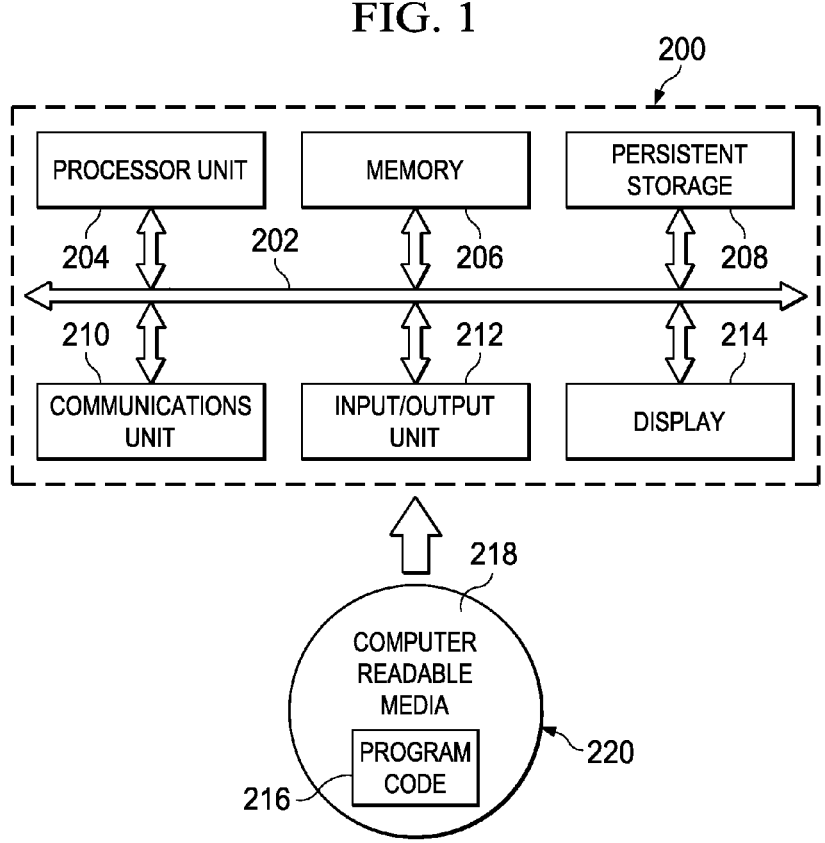
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
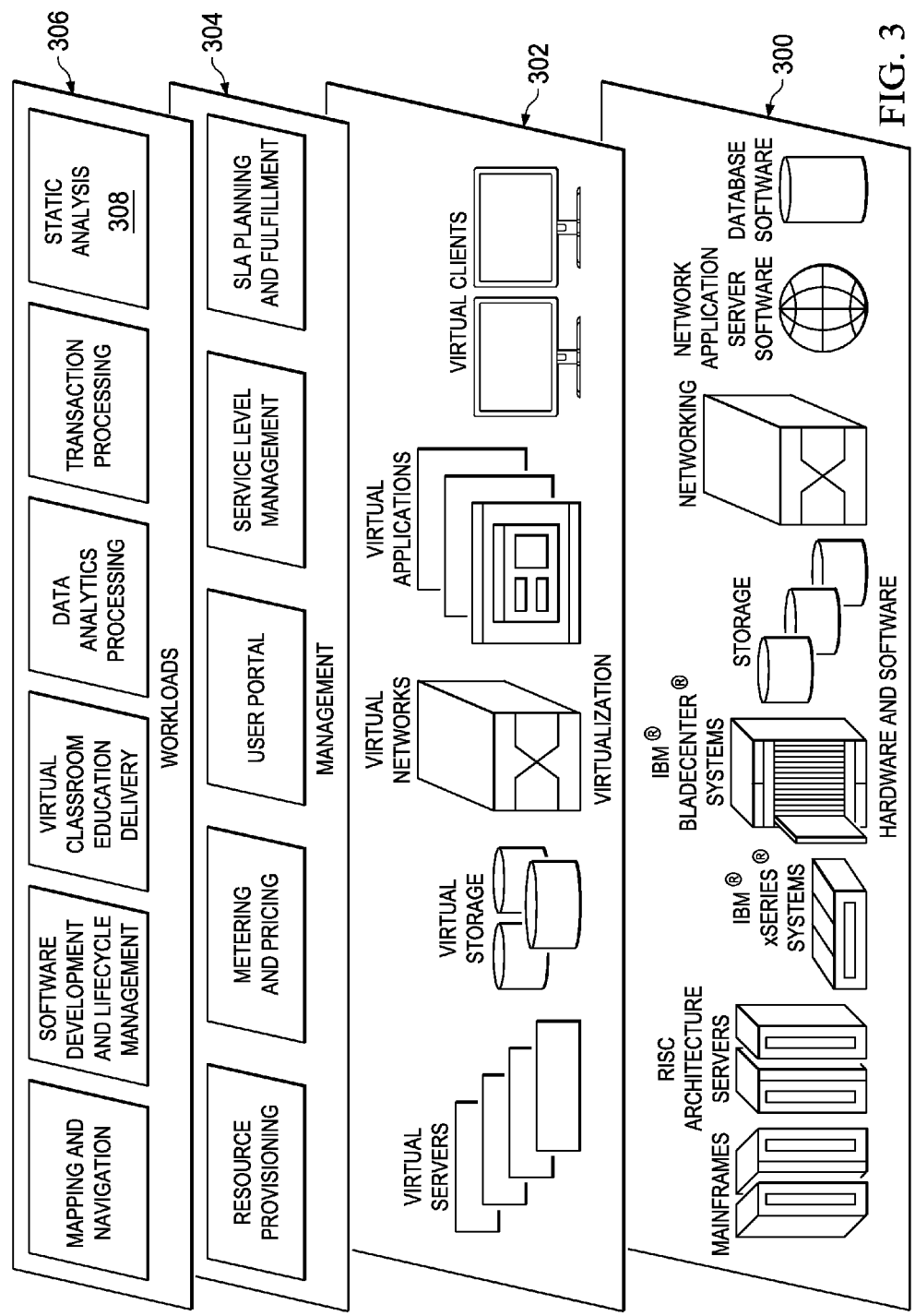
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided: Hardware and software layer 300 includes hardware and software components.

Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; enterprise-specific functions in a private cloud; and, according to this disclosure, static security analysis 308.

It is understood in advance that although this disclosure includes a detailed description on cloud computing, implementation of the teachings recited herein are not limited to a cloud computing environment. Rather, embodiments of the disclosed technique are capable of being implemented in conjunction with any other type of computing environment now known or later developed. These include standalone computing environments (e.g., an on-premises desktop machine), client-server-based architectures, and the like.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System X® servers with VMware vSphere 4.1 Update 1 and 5.0.

In one embodiment, a static analysis tool, such as IBM AppScan Enterprise Edition, is implemented as a cloud-based application.

Static Analysis Tools and Services

As is well-known, static analysis tools are used by computer software developers to provide information about computer software while applying only static considerations (i.e., without executing a computer software application). More formally, and as used herein, the term "static program analysis" means an analysis of a static representation of an application. In one type of static analysis, data flows are traced within a computer software application from "sources," typically application programming interfaces (API) that introduce "untrusted" input into a program, such as user input, to "sinks," typically security-sensitive operations such as modifying a database. More generally, the term "sink" or "security sink" means a module, function or procedure that consumes in input value and performs an operation on the input value that is security sensitive.

Such flows are identified as security vulnerabilities that may require remediation, typically by ensuring that a flow that is identified as a security vulnerability encounters a "downgrader" that validates and/or sanitizes untrusted input, such as by checking whether the input contains illegal characters or is in an illegal format, both common tactics used in malicious attacks. Generalizing, a "downgrader" refers to a module, routing or function that endorses, sanitizes and/or validates input data. Static analysis tools that identify security vulnerabilities typically provide computer software developers with a short description of each type of security vulnerability found, and may even provide sample code snippets that may be used by the developer to construct a downgrader for remediating the security vulnerability.

In operation, a static program analysis may analyze a call-tree representing previously recorded call stacks of the application to identify security vulnerabilities that may be present in the application. The term "call stack" refers to a stack data structure that stores information about the active subroutines of a computer program, such as an application. Without limitation, the static security analysis typically takes the form of taint analysis, where the analysis is parameterized by a set of security rules, each rule being a triple <Source, San, Sink>, where Source denotes source statements that read untrusted user inputs, San denotes downgrader statements that endorse untrusted data by validating and/or sanitizing it, and Sink denotes sink statements which perform security-sensitive operations. Given a security rule R, any flow from a source in SourceR to a sink in SinkR that does not pass through a downgrader from SanR comprises a potential vulnerability. This approach thus reduces security analysis to a graph reachability problem.

During static analysis of the computer program, the security analysis application analyses the computer model represented by the control flow call-graph, to determine whether there are potential paths, during execution of the computer program, from the source to the sink without the user-provided data being downgraded by the downgrader. One such path is indicated in the call-graph by an edge. This path generally is undesirable, and may indicate a security vulnerability in the computer program. In this regard, the edge can represent a witness to a security vulnerability, and this witness is then reported as a "finding" to the user.

Figure 4:
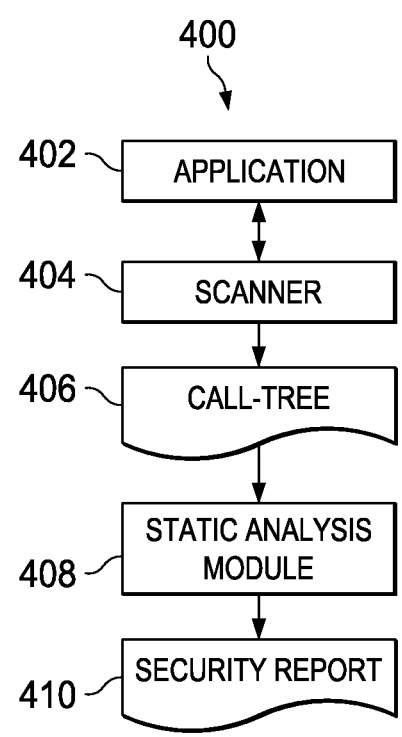
FIG. 4 is a block diagram illustrating a technique for analyzing vulnerable information flows in an application.

FIG. 4 is a block diagram illustrating a system 400 for analyzing vulnerable information flows in an application 402. In this known scenario, static analysis is used in addition to a black-box scan. As seen in FIG. 4, while the application 402 executes, the scanner 404 performs a scan of the application and, based on the scan, generates a call-graph 406 representing call stacks arising in the application during processing of test inputs provided to the application 402. The call-graph 406 may be pre-generated or provided from some other data source (e.g., a configuration file). As depicted, the system 400 includes a static analysis module 408 that performs a static analysis of the application 402. Specifically, the static analysis module 408 performs a static analysis of the call-graph 406 in which the call stacks identified by the black-box scanner 404 are recorded. As described above, in this way the static analysis module 408 can identify paths (i.e., flows) in the call-graph 406 that potentially represent security vulnerabilities in the application 402. For example, the static analysis module 408 can generate a security report 410 that indicates such paths as witnesses to security vulnerabilities. The security report 410 can be made to be available to a user in any suitable manner. For example, the security report 410 can be presented on a display, presented in a printout, stored to a file, or the like.

Static Analysis Using Abstract Program Representations (APRs) and Associated Archive Files An application analysis platform may be extended to provide for automatic generation of so-called abstract program representations (APRs, each an APR) that are amenable to static data-flow analyses for finding security vulnerabilities. An abstract program representation refers to a highly-compact version of the actual source code it represents. An APR for a particular source code component is generated automatically, preferably from either an existing build system or a source repository, and it is then encapsulated into a particular binary format for consumption by static application security tools, which may operate on-premises or via a cloud-based services platform.

Figure 5:
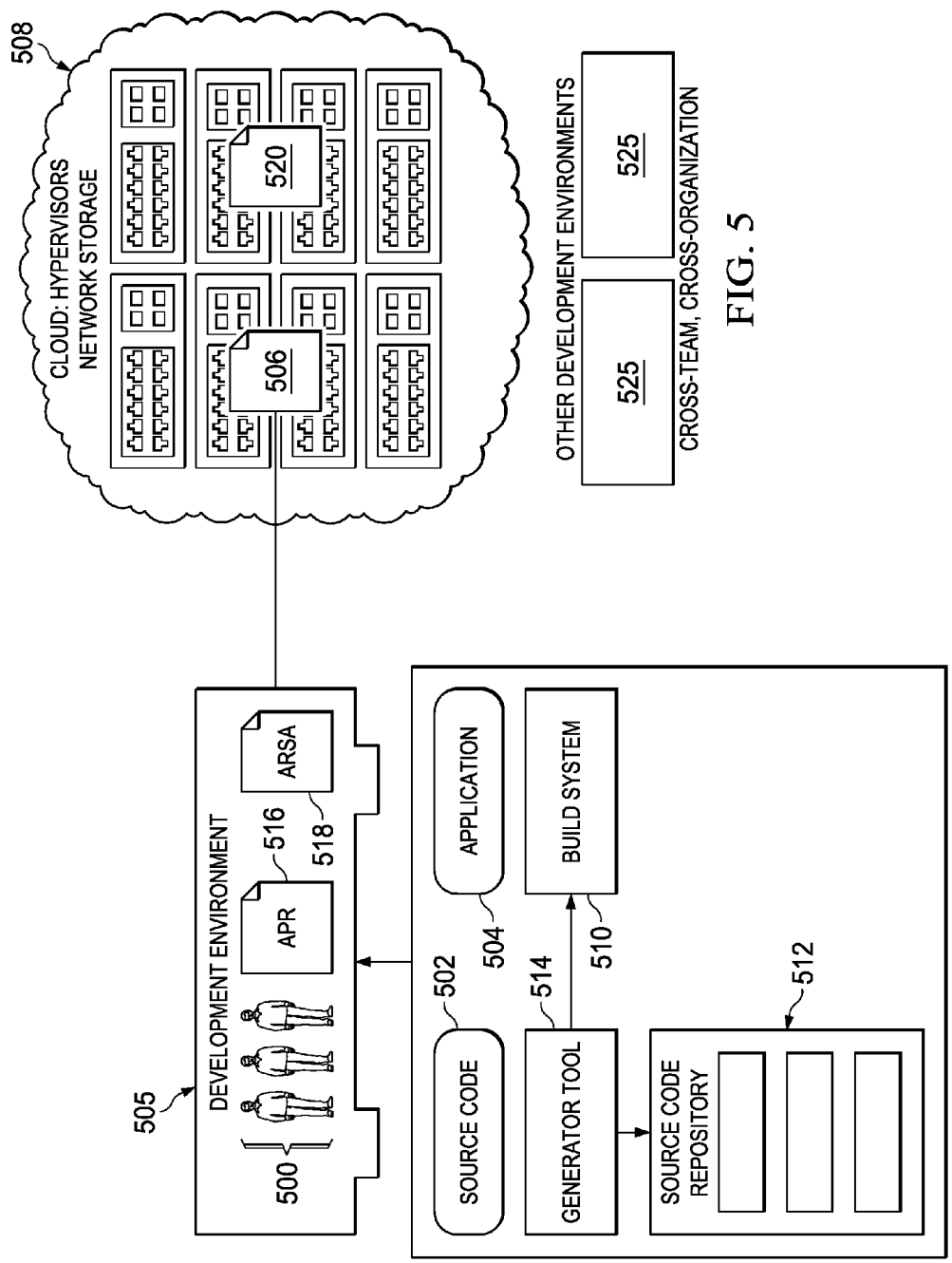
FIG. 5 is a representative computing environment in which the techniques of this disclosure may be implemented.

FIG. 5 illustrates an exemplary operating environment in which the above-described APR technique may be implemented. In this example environment, an on-premises development team 500 is responsible for developing a source code component 502 for an application 504. There may be one or more other development teams, and those teams may be co-located with development team 500, or located elsewhere. The application comprises multiple such components, and, with respect to a particular development location or time, any particular component may be undergoing development, modification, updating, or the like. As depicted, the environment includes a Static Analysis Security Testing (SAST) tool or agent 506 that, as is well-known and as described above (e.g., FIG. 4), is used to scan source code to identify potential security vulnerabilities, and that provides developers with assistance to triage and fix those identified vulnerabilities. The static analysis tool 506 operates either on-premises, or in a cloud-based platform 508.

An on-premises solution may be a standalone (e.g., desktop) product (e.g., FIG. 2), a network-based client-server solution (e.g., FIG. 1), a web-based solution, or the like.

As also depicted, the environment typically includes a build system 510, and a source code repository 512. A generator tool 514 is provided to automatically generate abstract program representations (APRs, each an APR 516) with respect to the source code component 502 of the application 504. There may be one or more abstract program representations APRs per code component, and an APR may be used by more than one code component. As noted above, the APR is a compact version of the actual source code it represents. The generator tool 514 creates the APR automatically, preferably from code generated within the build system 510 itself (i.e., on-the-fly as the code is built), or by integrated directly with the source code repository 512 that stores components already developed.

The generator tool 514 preferably includes an additional function, namely, it operates to encapsulate the APR into a binary archive file, which is referred to herein as an "Archive for Security Analysis" (ARSA) file 518. The ARSA file is sometimes referred to as a "container" because it contains the abstract program representation, albeit in a form that does not expose details regarding the source code from which the APR is generated. In a preferred approach, an ARSA file for an APR is created by serializing the APR into a compact binary file format container that preferably contains only the data necessary for static application security analysis. The ARSA file 518 effectively obfuscates the source code that will be subjected to the static analysis. Preferably, this obfuscation is accomplished with encryption and/or direct manipulation and translation of sensitive data into generic data that would be unhelpful to malicious users. With this approach, the ARSA file 518 is protected from being reverse-engineered even if it moved off-premises (into the cloud) or otherwise shared with other users, teams and even organizations. The ARSA file has a reduced amount of data, thereby reducing the bandwidth required to transport it across the network, e.g., to cloud-based platform 508.

The generator tool 514 typically is implemented in software, e.g., as a set of computer program instructions executed by one or more hardware processors. A particular generator tool may comprise any number of programs, processes, execution threads, and the like, together with appropriate databases to support data used or created by the tool. The tool may be configured or administered with a web-based front-end, via a command line, or the like. The tool may include one or more functions that are implemented programmatically, or that interoperate with other computing entities or software systems via an application programming interface (API), or any convenient request-response protocol. One component of the generator tool 514 may be used to create the APR, while a second component of the generator tool 514 may be used to convert the APR into the ARSA file. These functions may be separate or distinct, co-located or separated, or implemented with distinct tools, modules, programs, processes or devices. The particular nomenclature of the "tool" is provided merely for illustration purposes and is not intended to limit this disclosure.

ARSA files generated separately from different source code components 502 may be readily merged and analyzed together to provide more effective static data-flow analysis, even with respect to components that are built on different machines by different teams and at different times. This merging function typically occurs in the cloud platform 508 and thus is indicated by the merge function 520. The merge function 520 may be implemented on-premises as well, or in a system or location dedicated to this operation. The use of component-specific ARSA files that can be readily merged and tested, e.g., in the cloud, also facilitates incremental static analysis of the application as a whole because changes to an individual component do not necessarily require re-generation and upload of ARSA files for other unaffected components.

As also seen in FIG. 5, typically the cloud platform 508 interoperates with other development environments 525 that may be located remotely from the main development environment 505 shown, and that include other users, teams and/or organizations. The described facilitates cross-user collaboration within the development environment 505, as well as cross-team and cross-organization collaboration across the environments 505 and 525. This collaboration may occur even with the parties remaining anonymous from one another with respect to the code component ARSAs that are provided to the cloud platform and merged there by the merge function 520.

By way of additional background, the following provides additional details regarding the APR and how it is converted into an ARSA file. Without intending to be limiting, a typical Abstract Program Representation (ABR) for a source code component may be described as follows:

Abstract Program Representation={function-declarations, function-definitions, global-variables, class-fields} function-definition={function-name, formal-variables, local-variables, operations} function-declaration={function-name, formal-variables} operations={call-operation, assignment-operation, return-operation, field-load-operation, field-store-operation} call-operation=simple-call-operation or virtual-call-operation simple-call-operation={caller-signature, callee-signature, arguments} virtual-call-operation={caller-signature, callee-signature, arguments, virtual-overrides}, and so on.

The abstract program representations may be generated automatically from existing build systems in the development environment. In this embodiment, the generator tool interfaces to the build system over an application programming interface (API), or via some other request-response communication protocol. The particular technique by which the generator tool interfaces to the build system is not intending to be limited.

Figure 6:
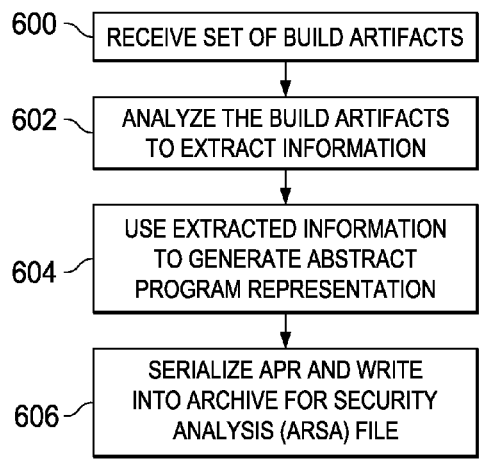
FIG. 6 depicts a process flow of a first embodiment wherein a generator tool generates abstract program representations from code in a build system.

The basic operation is shown in the process flow in FIG. 6. At step 600, a set of build artifacts is received. The routine then continues at step 602 to analyze the build artifacts to extract certain information, such as the paths to the build outputs, the paths to the source code directories, compile-time dependencies, and the like. At step 604, the information obtained from the analysis in step 602 is used to generate the APR. At step 606, the APR is then converted into the ARSA file to complete the process. The ARSA file is then consumed by the SAST tool, either locally or following transport to the cloud. Preferably, the process shown in FIG. 6 operates autonomously and in an automated manner, generating the ARSA file as the set of build artifacts are received or otherwise made available.

Figure 7:
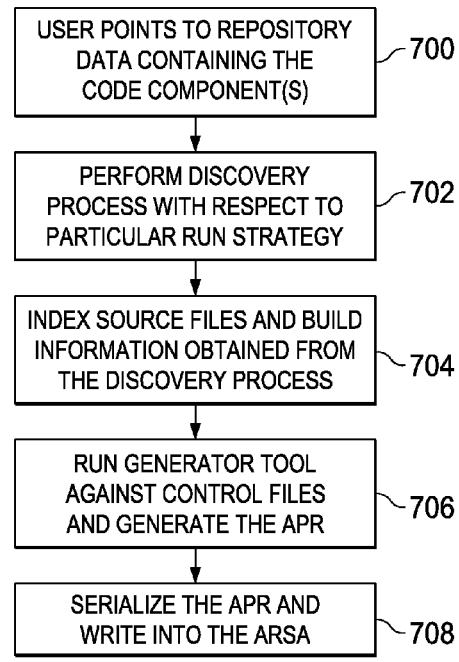
FIG. 7 depicts a second embodiment wherein a generator tool generates the APR from code obtained in a source code repository.

Alternatively, the abstract program representation is generated from the source repository. This approach typically involves the operations shown in the process flow in FIG. 7. The operation begins at step 700 with the user pointing to the repository data containing the code component(s) that need to be scanned by the SAST tool. At step 702, a discovery operation is initiated. In particular, and in order to handle any arbitrary code extracted from source repositories, the discovery process 702 preferably is designed to be extensible with technology-specific run strategies. A given run strategy determines whether a build artifact is a target (that is, a container of other targets and files), or a file for which abstract program representation should be generated. The relationship between targets and files lends itself well to a file system hierarchy. Thus, in one example, the discovery operation simply identifies a containing directory as a target, and then crawls through the directory to collect files of recognizable extension types. In a more complex run strategy, the discovery operation treats the directory as a "project," e.g., from an Integrated Development Environment IDE, e.g., Eclipse, or Visual Studio. In either case, the discovery operation extracts the metadata from such a project to find the build dependencies that would be needed for the generation of the abstract program representation. In yet another example that involves a yet more complex run strategy, the discovery operation works by transforming the source it finds into other formats (e.g., building of C/C++ into object code) as required. In these example scenarios, which are not intended to be limited, a target does not necessarily have to physically contain the files under it. For example, an Ant build XML file can be thought of as a target that "contains" the files that the build produces, and this relationship is dictated by an appropriate Ant run strategy that understands the structure of build XML files.

Generalizing, the discovery process 702, either alone or in combination with the one or more technology-specific run strategies, takes as input source code extracted from a repository, and then identifies the targets, files and related build information that are present. The various run strategies may be quite varied, e.g., a scan target file strategy, a directory-based strategy, an Eclipse Workspace strategy, a build.xml strategy, a custom run strategy, and others. The discovery process enables the generator tool to find build artifacts when available (e.g., by file browsing and direct pointing), and to distinguish non-build outputs identified during directory browsing from build objects (e.g., class files, EARs, WARs, JARs, EXEs, DLLs, etc.) throughout the code tree.

The process then continues at step 704 to index the artifacts (i.e. source files and build information). At this step, the data collected from the discovery process is written out to a series of control files that mirrors the hierarchy of targets and files. These control files act as instructions to the generator tool and, in particular, to pinpoint the source files that the generator needs to process. At step 706, the generator tool is executed against these control files to generate the abstract program representation. At step 708, the APR is serialized and/or encrypted, and written into the ARSA file to complete the process.

Preferably, the ARSA file generated in this manner is uploaded back to the source repository and stored together with the code that it was generated from. This enables the ARSA file to be sent for security scanning whenever needed. Moreover, when other components use the code in question (likely in the form of a library), other users may access the repository, obtain the ARSA, and then stitch together the component's APR with that of the other components.

As described above, preferably there are two approaches for building ARSA files automatically, e.g., by plugging the ARSA generator tool into a build system (FIG. 6), or by pointing it to a source repository (FIG. 7), to thereby create a library of ARSA files that can be pulled in for analysis whenever required. This analysis is sometimes referred to herein as a "whole-application" analysis, wherein different components of the application, although built at different times, different locations, or by different teams, are still scanned together as an integrated or unitary whole. This analysis also is useful for "incremental" analysis, wherein an individual component of the whole is updated and modified, with the result updated or modified ARSA then re-integrated into the whole and the result then scanned.

As noted above, typically the merge operation is carried out in the cloud platform, with one or more component ARSA files provided from one or more distinct sources.

Crowdsourced Security Analysis Platform

The above-described techniques are advantageous, as they avoid traditional installation and deployment troubles that often accompany SAST tools. Because the generator tool generates obfuscated application metadata (the abstract program representation), users can feel comfortable uploading off-site, namely, to the cloud. As also noted, the approach thus promotes simple and effective cross-user, cross-team and cross-organization collaboration with sufficient anonymity to alleviate or ameliorate security concerns. The approach may be implemented by users that are entirely anonymous to one another. Given the protections and functionalities afforded by the described technique, a cloud-based security analysis platform may even expose these functionalities on a crowdsourced basis. The following provides a further description of several preferred methods for secure and anonymous collaboration between and among users of the system. As will be seen, to encourage this collaboration, one or more incentives may be provided to the users.

By way of additional background, and as known in the art, crowdsourcing has developed as an increasingly popular approach for performing certain kinds of important tasks. In a crowdsourcing effort or procedure, a large group of organizations, individuals and other entities that desire to provide pertinent services, such as a specific community of providers, or the general public, are invited to participate in a task that is presented by a task requester.

Figure 8:
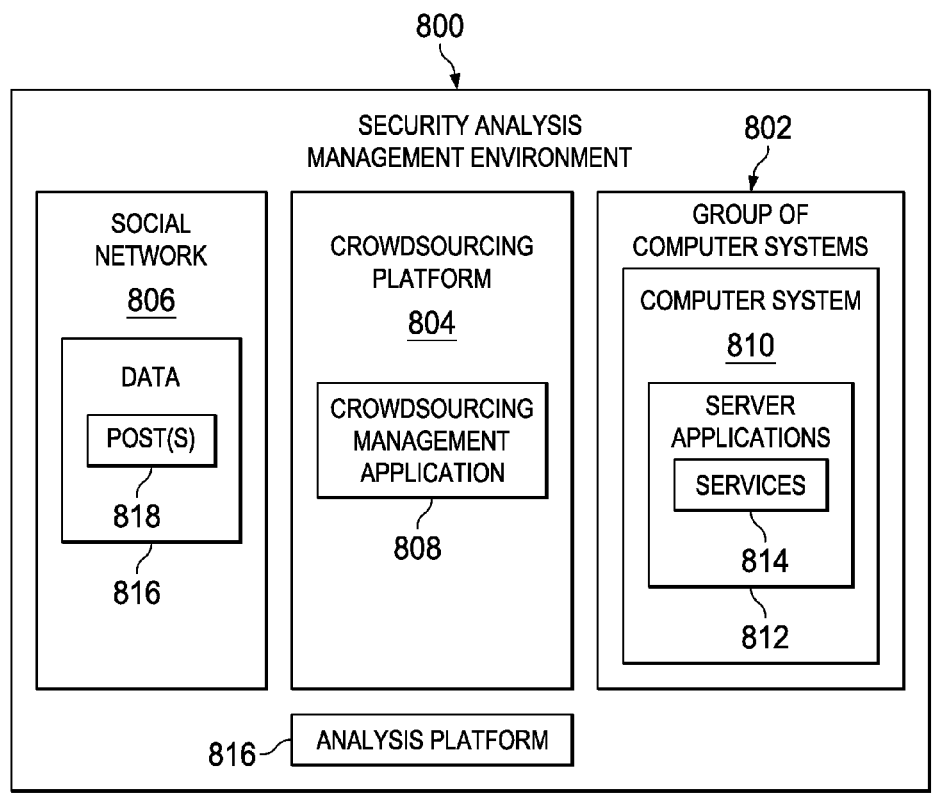
FIG. 8 depicts a crowdsourcing security analysis platform of this disclosure.

FIG. 8 depicts a crowdsourced security analysis environment 800 according to this disclosure. The approach assumes a set of users, each of whom may be partly or entirely anonymous to one another. To provide a more concrete example, a particular user typically is associated with a development environment (such as shown in FIG. 5), which as noted has the capability to generate and upload to the cloud environment APRs and ARSAs. More generally, there are two or more development environments (users), each associated with different enterprise (business or corporate) entities, and there is a desire or need to ensure that identity of a particular development environment or its sponsoring business entity (or some individual user associated therewith) remain anonymous to other participants.

As depicted, the crowdsource security management environment 800 typically includes a group of computer systems 802 that support a crowdsourcing security analysis platform 804 (the "crowdsourcing platform") and an associated social network 806. The crowdsourcing platform executes a crowdsource management application 808 for the purposes described below. The crowdsourcing platform 804 and the social network 806 in turn are hosted on the group of computer systems 802. As used herein, "group of" when used with reference to items means one or more items. For example, group of computer systems 802 is one or more computer systems, such as computer system 810. When computer system 810 is more than one computer, the computer system may take the form of a computer cluster, group of computer systems, or other configurations of computer systems configured to run server applications 812. A server application 812 provides one or more services 814 to support the crowdsourcing environment 800.

Typically, an individual user (or, more generally, entity) executes a development environment system (FIG. 5), and each environment system communicates securely with social network 806 and the crowdsourcing platform 804 over one or more communication networks. In this example, the social network 806 may be a web-based application having data 816 entered by users. The social network 806 typically provides various services (such as provided by services 814) to search for, browse, enter, and modify such data 816. The data 816 may include one or more user "posts" 818 to a user forum that is hosted by the social network 806.

In general, and as will be described further, the crowdsourcing platform 804 serves as a broker or intermediary between information requesters and providers who are interested in undertaking or participating in user forums (or other social networking activities) that are associated with the development environment(s) that are operated by the users. To this end, the crowdsourcing platform 804 executes the crowdsource management application 808, typically as a set of one or more cooperating computing entities (programs, modules, execution threads, etc.) and associated databases. Typically, the management application 808 is web-accessible. The management application 808 is depicted as a single application but this is not a limitation, as the various functions and operations provided by the application may operate over the group of computer systems utilizing the server applications and associated services. The management application operations may be carried out in a centralized or distributed manner. Further, one or more application programming interfaces (APIs) may be provided by or in association with the management application to provide for programmatic or automated operations.

Without limitation, the crowdsourcing platform environment depicted in FIG. 8 may be implemented in whole or in part within the cloud environment previously described, although this is not a limitation.

The social network 806 may comprise a dedicated component of the management environment 800 or it may leverage existing social network infrastructure or services (e.g., Facebook). Generalizing, social network 806 comprises a social network application that hosts a social networking site (or "application") on a social networking server, such as one or more of the server applications 812. The social networking application provides interfaces for clients for interacting with the different implemented functions of the social networking application. For example, the social network application can allow a user to share messages, images, videos, blog or journal posts, and the like. The social networking application also allows permitted users to create their own profile, and search and browse other users' profiles to establish new "contacts," or a larger social network. One or more of such operations or functional capabilities are implemented by the services 814. In a typical scenario, a social network is secure and open only to particular individuals, as opposed to being open to the general public. To support such privacy, one or more security features (e.g., secure registration, peer invitation, peer acceptance, secure posts, password-protected pages, etc.) may be implemented.

It is not required that end users interact with the crowdsourcing platform and social network via a development environment such as depicted in FIG. 5, but this is anticipated to be a typical implementation. In an alternative environment, end users interact with the platform and social network using conventional end user client machines executing HTTP or HTTPS-based rendering tools such as web browsers, mobile applications, and the like.

According to this disclosure, the crowdsourcing platform 804, by and through its crowdsource management application 808, provides several distinct service methods for secure and anonymous collaboration, which service methods are now described. These service methods preferably include one or more of the following: an anonymous discussion forum, techniques to enhance or encourage collaboration among users, and techniques to integrate access to third parties to enable users to obtain third party assistance with respect to application security workflow-related issues.

A first service method to facilitate collaboration among such users is for the crowdsourcing platform to provide for an anonymous online discussion forum, where questions and solutions can be discussed by participating forum members or "participants." In this service method, a user registers with the forum and is permitted to submit posts 818 to the user forum. The user forum typically is implemented as an on-line web-accessible forum via secure communications between an end user machine and the machines upon which the user forum executes. The user forum may be organized by subject, by chronology, or the like. The user forum is output (as a service 814) in the form of one or more web pages. The user forum typically has an associated search engine front-end interface, although searches may also be carried out programmatically through an API. For example, users who are seeking guidance about how to interpret a security finding can search the forum to find related discussions and also ask questions (via posts 818). As noted, an implementation of the online discussion forum may be provided through hosting interactive web pages on a service provider domain associated with the group of computer system, a particular computer system, or even a server application, together with known discussion forum tools.

In one aspects, preferably users of the forum are given unique names by the management application 808. The management application 808 generates these unique names as needed, e.g., as users join the discussion forum. A unique name is an identifier or designation that is viewed and referred to by other members. Preferably, a user has no control over the user name that the management application 808 generates and assigns (to that user) so there is no risk of a user name revealing too much about a user's company or project.

In addition to the system-supplied unique user name, preferably the management application 808 ensures that content communicated to the platform generally (and to the user forum in particular) is protected against inadvertent leakage of sensitive (e.g., corporate identity) data. As noted above, preferably the crowdsourcing occurs within the context of multiple development environments operated by distinct entities but in a manner that enforces (or at least attempts to insure) participant (both enterprise and end user) anonymity. To this end, management application 808 preferably executes one or more content parsers that look for given information or patterns (in communications that originate from the individual development environment entities) and that may be suspicious or include information that might otherwise undermine the desired anonymity of the information exchanges that are enabled by the crowdsourcing platform. Such patterns include, without limitation, company name, user name, one or more "attribution-type" phrases (such as "work at," "my project," "I'm from" and many others), and the like.

Regarding company or user name, preferably a particular entity registers with the crowdsourcing platform and thus the management application has knowledge of which company a particular user works. This information is aggregated and stored in a database; a content parser searches against this database to determine whether a message to the service includes company name information. Similarly, the database can be populated with one or more attribution-type phrases that are searchable by the content parser to identify information that might inadvertently identify sensitive corporate data. Preferably, the management application also includes one or more content parsers that process crowdsourced messages uploaded to the service to ensure that they do not inadvertently include code snippets. To this end, a content parser searches received messages for use of characters or expressions most normally indicating source code, such as curly braces, lines ending in semi-colons, and various keywords such as "int," "boolean," "char," and the like.

Upon submission of a new message posted in or attempted to be posted to the user forum, the management application 808 processes the message through one or more content parsers to determine whether any data leakage has occurred. If the management application 808 finds any of these (or various other) indications of data leakage in the message content, the application alerts the user (or some other designated individual) and highlights the areas of the message in question. Preferably, the management application also provides automatic and inline code obfuscation if the message post 818 does include source code.

Preferably, the management application 808 exposes various social networking widgets, such as comment widgets, voting widgets, rating widgets, and the like, throughout the various pages. Thus, for example, comment widgets may be used to collect information from participants about existing or new features of the platform, to collect information on fix recommendations for a given security finding, and so forth. Voting widgets, for example, may be used to enable participants to vote on which aspects of the platform they like, or that they might like to see changed or modified, etc. These are merely representative examples of how such widgets may be used to facilitate participant feedback.

In addition, preferably the management application provides one or more incentives to facilitate user participation, especially from users who can offer helpful guidance. To incentivize those users to participate in the forum, preferably the management application provides a backend social networking tool that collects user "ratings." For example, using the social networking tools, users can "rate" answers in terms of their usefulness. A point system associated with the ratings systems associates given system-configurable "points" to particular ratings. Individuals that are more prolific in responding to posts, or that who are rated by the peers as providing more useful answers to posts, receive such points, which can then be accumulated and used as "credits" towards additional security analysis, or other prizes.

Figure 9:
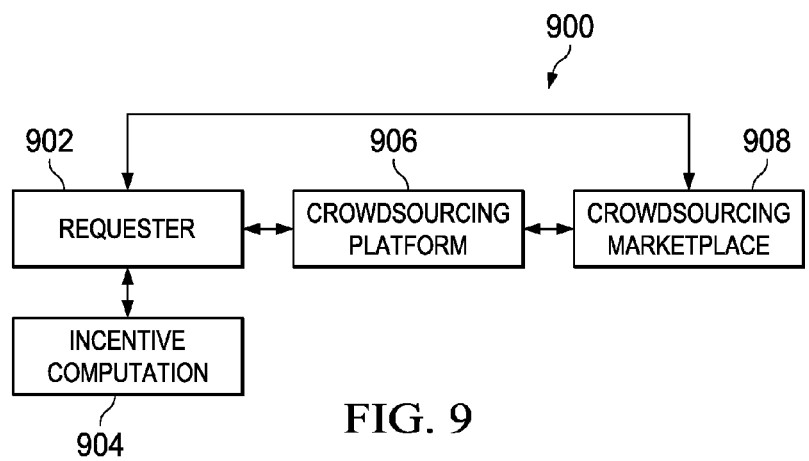
FIG. 9 depicts how the crowdsourcing platform may be augmented by an incentive mechanism.

FIG. 9 depicts an alternate embodiment 900 that provides an incentive-based approach to encourage social networking participants (or others) to participate in the social network. In this example, requester 902 is an entity such as a business enterprise or other organization (or an individual therein) that desires to have a particular task performed. The task, for example, could be requesting a response to a post about a development-related activity. Requester 902 specifies a task requirements description, and he or she may also provide acceptance criteria to define successful task completion. Requester 902 also may specify start and end dates, and incentives. In accordance with an embodiment, the system may provide an incentive computation component 904 (such as a point-based system that is based on ratings or other considerations) to determine an incentive amount or value for the task. Requester 102 initiates the crowdsourcing process by submitting a request for performance of the particular task to the crowdsourcing platform 906. As noted, typically the platform 906 is a broker that posts or presents the task request to the crowdsourcing marketplace 908, which comprises all of the participants or others who are authorized to access the social network. Thus, typically marketplace 908 comprises other participating users in the forum, and perhaps other providers (third parties) who may be interested in performing the task (or who can otherwise respond) and have the skills and capability to do so. One of these providers may respond to the post or be subsequently selected to complete the task. Once the task completed, the rating(s) may be collected and the points awarded, e.g., to facilitate the incentive computation. There is no particular requirement for how the incentives are calculated or awarded.

The next service method supported by the crowdsourcing platform 806 provides for one or more improvements to how users of the system collaborate. In particular, preferably the management application 808 or exposes social networking tools pervasively across all (or given) pages to enable users to rate, comment and influence the evolution of the system itself. To this end, and to insure that users remain engaged with the system and feel that is responding to their needs, preferably all pages in the system have capabilities built-in (e.g., via user textboxes, fill-in forms, etc.) to accept user feedback. From this information, the management application (either natively or with additional support, e.g., from a machine learning algorithm)) learns, and can extend and personalize responses or other information available from the forum. In one embodiment, the management application 808 includes backend machine learning (ML) tools to collect feedback from users or from aggregate analysis of user behaviors and engagement with the system. Direct feedback may be gathered, for example, by the social networking tools that are exposed throughout the forum.

With users having the ability to comment on the forum in general and, the system can evolve in use, preferably based on real and current usage or other activity data. As an example, the management application 808 may alter the information that is provided or otherwise exposed by the forum based on user feedback or other collected information. As another example, the management application informs users when changes to the system have been made as a direct result of the user feedback. This capability enables the management application to provide information that is responsive to user needs. Preferably, the system also monitors user engagement and use data (e.g., such as which pages get the most attention and which may need to be removed or rethought) so that the management application may be modified or updated accordingly, once again with the end goal to improve continually the user experience with the collaboration site.

The management application 808 also preferably supports the ability to personalize the system. One of the traditional problems with known security tools is that the security information provided by such tools is static and the user must internalize it and make it applicable for its environment. The problem is exacerbated when many users from the same application have to all go through that process separately. The management application addresses this problem by providing a capability for a user to customize provided data and to share that custom data with other users (e.g., within a post). To take an example, when a security tool finds an issue in application code, such as a SQL Injection vulnerability, it typically provides the user with some documentation about what the issue is, what is important to fix, and perhaps one or more recommendations for how to remediate this issue. All of that data can be associated with one or more posts to the forum so that others similarly situated may benefit. If a user desires to augment that information with other data, to modify the existing information, or to completely write their own information, he or she can do so, and then make that available for others to view and share. One use case this supports is a large enterprise that wants to enforce not just a security policy but also how certain issues should be fixed. One user from that organization can update the documentation and then other users can benefit. Of course, these are merely representative use cases and are not intended to limit this disclosure According to still another aspect, the management application 808 provides a service method for connecting users with other users, e.g., to enable an organization to delegate some parts of the application security workflow under development. For example, if a user has completed a security scan and is struggling to prioritize or remediate the issues, preferably the system (whether in the user forum or otherwise) offers the user the ability to connect to a third party who, perhaps for a fee, can help with that task. Preferably, third parties providing such services would be vetted before gaining access to the platform. Preferably, these third parties also are subject to comments, voting and ranking so that users can make good choices regarding which third parties to use and under what circumstances. In this manner, the platform provides a way to match security issues to subject matter experts (either within the same company or in a different company).

In addition to users manually choosing third parties, preferably the management application 808 further provides support to enable users to opt-in to a capability to have the system automatically connect them with other users that may be able to help with respect to particular development-related activities. For example, crowdsourcing platform may interoperate with one or more of the security analysis functions of the cloud platform to provide a mechanism that makes suggestions based on the results of a security analysis. For example, if a user performs an application security scan and the report contains issues that are very similar to issues found by someone else from the same (or some other) company, the system may offers to connect those users and suggest they collaborate on the solution. Or, the system could direct them to the user forum to see related discussions.

The management application 808 also may provide for programmatic access to the system by which users generate or obtain information including, without limitation, customized reports, specialized information, or the like. Preferably, and as noted above, one or more application program interfaces (APIs) may be exposed by the platform to enable programmatic interaction with the management application. Thus, certain classes of permitted users may be allowed to augment to system to facilitate analysis with additional capability. For example, a business partner may want to provide a new type of analysis (such as support for scanning a new language), and the system provides all the appropriate extension points to do that in a way where the development efforts of the core system and the business partner can remain separate. Once again, this example is not intended to be limiting.

This subject matter of the crowdsourcing platform may be implemented as-a-service. As previously noted, and without limitation, the subject matter may be implemented within or in association with a cloud deployment platform system or appliance, or using any other type of deployment systems, products, devices, programs or processes. As has been described, the crowdsource management application functionality may be provided as a standalone function, or it may leverage functionality from other products and services.

A representative cloud application platform with which the crowdsourcing security analysis environment and service may be implemented includes, without limitation, any cloud-supported static analysis tool(s), which operating environment can be extended to facilitate secure and anonymous collaboration between and among users of the cloud-based platform in the manner described.

The techniques described herein provide numerous advantages, primarily cross-user, cross-team and cross-organization information sharing and collaboration, all with sufficient anonymity to alleviate any possible security concerns despite the highly-sensitive nature of the underlying code development activities. Indeed, the approach here may be implemented by users that are entirely anonymous to one another. A fact-based quantitative analysis, as well as incentive-based award programs, provide ways to guide the evolution of the platform to provide further end user use and acceptance, thereby increasing the value of the information that is made available from the site. The crowdsourced approach enables the providing of much more fine-grained information to users, including the providing of targeted and specific remediation advice where needed.

Cross-Application and Cross-Client Analytics to Improve Results and User Experience The crowdsourcing platform provides participants with the ability to take advantage of SAST-generated security findings from others. The notion here is that historical security analysis, triage and remediation data from different projects and organizations can be leveraged to help SAST tools filter and prioritize security findings, which can significantly reduce the time needed to identify real security vulnerabilities and to select high priority security vulnerabilities to fix.

To this end, with the SAST tool supported in the cloud, preferably the system automatically collects and analyzes historical data (from the users of that tool) to improve the result of security findings. Using the crowdsourcing platform and social network, security knowledge sharing is enabled anonymously among organizations that use the tool, all without revealing sensitive data. Preferably, the system supports an analysis platform 816 that includes one or more machine learning (ML) algorithms that receive the security knowledge generated by the tool and then create up-to-date security knowledge data.

To facilitate the creation and maintenance of this knowledgebase, preferably the analytics platform 816 includes one or more analytics processes supported, e.g., by the services 814. In one aspect, an analytics process compares the security findings for the same project scanned at different times to learn the priority of security findings. For example, if a cloud server scanned a project in week one, and scans the same project with fixes from developers in week two, there are two security analysis results for the same project. By comparing the security findings from these two analysis results, the analysis process identifies which findings have been fixed by the customer (client). It can be assumed that the user would have fixed severe vulnerabilities that were reported earlier as high priority, and that the user would have ignore false-positives or security findings that were less important to them. By looking at the security findings which customers have fixed, the analysis process identifies which findings are more important than others. As more and more data is generated and collected in the knowledgebase, it reflects the priority of findings.

Different industries and types of applications have different criteria to filter security findings and prioritize the fix for the security findings. Thus, typically it is not generally useful to apply the same security finding ranking approach to all the applications from different industries. To address this, preferably the analysis process also identifies major characteristics of applications and classifies them into different categories, such as by associated industry (e.g., financial services, e-commerce, insurance, entertainment, etc.), by public API used by the application, by programming language of the application, and so forth. This information preferably is collected in the knowledgebase and accessible from the crowdsourcing platform.

Given the above-identified categorization scheme, a project may be associated with one or more categories. For each project, preferably the analysis process obtains a list of security findings and can prioritize them, e.g., using the above-described prioritization scheme. The resulting prioritization information (i.e. the priority of security findings for the project) may then be used as input to machine learning algorithm that also receives as input the category of the application and a list of security findings from the application. Using these inputs, the machine learning algorithm can learn and establish a relationship between the priority of findings data, and the category data. Thus, when a new application with a list of security findings is presented (i.e. a new project), the trained machine learning algorithm can prioritize the security findings in the list.

Thus, for example, after the cloud-based SAST tool scans a new project from a customer and obtains a list of security findings, the trained machine learning algorithm preferably filters and prioritizes the security findings presented to the customer. As a more concrete example, assume that the historical data of scanning applications belonging to financial services industries (the category), the machine learning algorithm learns that a specific type of security finding is always fixed as soon as it was reported by the SAST tool; with that information in the knowledgebase, the machine learning algorithm can use this information to identify such findings in future scans of applications that originate from customers/clients in the financial services industry. In such circumstances, there is a high likelihood that those new security findings with the same type have a high priority are thus need to be fixed promptly.

In addition to the above, by analyzing data obtained over a time period and from different users, the analysis program can proactively recommend or offer opinions on the security of various source components (including open source), revisit past scans when new security information is available (notifying users of changes if necessary), include specifics about issues and fixes for vulnerabilities in remediation advice as guidance for users, and generally improve security analysis results based on analytics. Any of such information may be posted or otherwise published to the crowdsourcing platform and its associated social network.

Analytics may also be performed on overall scan results on the platform to provide additional insight into security analysis activity across the system. Based on that information, users can be provide useful information that may assist them in identifying the areas that are currently interesting in the security domain, in choosing secure libraries, and so forth. To this end, when a user uploads a scan-able artifact to the cloud or registers for an account in the cloud platform, the user is queried whether to agree that data about the scan can be collected anonymously for analytics purposes. If the user provides consent, the analytics data is then collected into a data store and made available to the knowledgebase. Based on the scan, the following types of information may then be collected and available as part of the knowledgebase: the vulnerability types of findings (such as XSS, SQL injection, etc.) and related function signatures, for a given application, which security vulnerabilities have been fixed from a previous scan (as determined by comparing consecutive scan results that a user uploads), program language(s) of the application, size of the program, scanning time, the libraries and frameworks used by the application, the density of findings, and so forth. After this data is collected, the cloud platform analysis process can provide different types of analytics, such as: top vulnerabilities identified over a given time period (days, weeks, months, etc.), top vulnerabilities fixed over a given time period, average time for fixing each vulnerability (or a particular vulnerability), most (least)-vulnerable programming language, library and framework, average density of security findings, and so forth. These analytics may be exposed in web-accessible reports, or otherwise output to the crowdsourcing platform and social network participants.

The knowledgebase also may include a compatibility database such that, for each function signature (representing an application function), that signature may be grouped together with other (e.g., semantically) equivalent function signatures. For each function in the same group, the knowledgebase preferably records the percentage of application(s) that use each of them, and the system may also calculate the percentage of secure applications (namely, those that have some defined density findings lower than a configurable threshold). Such a report can be sent back to a specific user to suggest more secure practices, or it may be made available to the social network, e.g., as a list of top vulnerabilities displayed on a dashboard.

The above-described cross-application and cross-client analytics may be expanded to include other useful information that may then be made available to the crowdsourcing platform and social network. By accessing the knowledgebase, a user can obtain highly useful information that can then be leveraged to assist the user to generate and implement workflows for resolving vulnerabilities identified by static scans.

Generalizing, the techniques herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the generator service be executed by a particular component as named above, as the functionality herein (or any aspect thereof) may be implemented in other or systems.

The crowdsource management application functionality (in whole or in part) can interact or interoperate with security analytics systems or services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

As noted, and in addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the security assurance service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, static security analysis tools and systems, and cloud-based systems, as well as improvements to the functioning of software development tools and methods.

Having described our invention, what we now claim is as follows:

1. A method to reduce security vulnerability in association with a cloud-based static analysis security tool that is accessible by a set of application development environments, comprising:
    associating a social networking platform with the application development environments;
    enabling anonymous access to the social networking platform by users of the application development environments, the anonymous access enabling users to upload messages for posting to a forum;
    prior to posting, filtering a message and, responsive to the filtering, automatically obfuscating sensitive data associated with a particular application development environment and any application code included in the message;
    receiving security findings generated as users of the application development environments use the cloud-based static analysis security tool;
    processing the received security findings using machine learning, and storing the processed security findings into a knowledgebase; and
    providing social network content associated with the processed security findings from the knowledgebase as crowdsourced security knowledge generated from use of the cloud-based static analysis security tool by users of the application development environments.

2. The method as described in claim 1 wherein enabling anonymous access includes:
    receiving a message from a first user for posting to the forum;
    parsing the message for information from which an identity of an organization to which the first user is associated is obtainable; and
    modifying the message to obscure the identity.

3. The method as described in claim 1 wherein the social network content includes analytics generated from execution of the static security analysis tool in association with the set of application development environments.

4. The method as described in claim 3 wherein the analytics includes an analysis of security findings from a project associated with two or more of the application development environments, and recommendations regarding security findings.

5. The method as described in claim 1 further including:
    collecting information about use of the social networking platform; and
    modifying at least one function or characteristic of the social networking platform based on the collected information.

6. The method as described in claim 1 wherein the social network content includes information identifying a third party that is available to provide assistance to a user to facilitate a remediation identified by the static security analysis tool.

7. The method as described in claim 1 wherein at least first and second of the application development environments are associated with different organizations.

8. Apparatus, comprising:
    a processor;
    computer memory holding computer program instructions executed by one or more processors to reduce security vulnerability in association with a cloud-based static analysis security tool that is accessible by a set of application development environments, the computer program instructions operative to:
        associate a social networking platform with the application development environments;
        enable anonymous access to the social networking platform by users of the application development environments, the anonymous access enabling users to upload messages for posting to a forum;
        prior to posting, filter a message and, responsive to the filtering, automatically obfuscate sensitive data associated with a particular application development environment and any application code included in the message;
        receive security findings generated as users of the application development environments use the cloud-based static analysis security tool;
        process the received security findings using machine learning, and store the processed security findings into a knowledgebase; and
        provide social network content associated with the processed security findings from the knowledgebase as crowdsourced security knowledge generated from use of the cloud-based static analysis security tool by users of the application development environments.

9. The apparatus as described in claim 8 wherein the computer program instructions operative to enable anonymous access includes computer program instructions to:
    receive a message from a first user for posting to the forum;
    parse the message for information from which an identity of an organization to which the first user is associated is obtainable; and
    modify the message to obscure the identity.

10. The apparatus as described in claim 8 wherein the social network content includes analytics generated from execution of the static security analysis tool in association with the set of application development environments.

11. The apparatus as described in claim 10 wherein the analytics includes an analysis of security findings from a project associated with two or more of the application development environments, and recommendations regarding security findings.

12. The apparatus as described in claim 8 wherein the computer program instructions further include computer program instructions to:

collect information about use of the social networking platform; and modify at least one function or characteristic of the social networking platform based on the collected information.

13. The apparatus as described in claim 8 wherein the social network content includes information identifying a third party that is available to provide assistance to a user to facilitate a remediation identified by the static security analysis tool.

14. The apparatus as described in claim 8 wherein at least first and second of the application development environments are associated with different organizations.

15. A computer program product in a non-transitory computer readable medium for use in one or more data processing systems, the computer program product holding computer program instructions executed by the one or more data processing systems to reduce security vulnerability in association with a cloud-based static analysis security tool that is accessible by a set of application development environments, the computer program instructions operative to:

associate a social networking platform with the application development environments;

enable anonymous access to the social networking platform by users of the application development environments, the anonymous access enabling users to upload messages for posting to a forum;

prior to posting, filter a message and, responsive to the filtering, automatically obfuscate sensitive data associated with a particular application development environment and any application code included in the message;

receive security findings generated as users of the application development environments use the cloud-based static analysis security tool;

process the received security findings using machine learning, and store the processed security findings into a knowledgebase; and provide social network content associated with the processed security findings from the knowledgebase as crowdsourced security knowledge generated from use of the cloud-based static analysis security tool by users of the application development environments.

16. The computer program product as described in claim 15 wherein the computer program instructions operative to enable anonymous access includes computer program instructions to:

receive a message from a first user for posting to the forum;

parse the message for information from which an identity of an organization to which the first user is associated is obtainable; and modify the message to obscure the identity.

17. The computer program product as described in claim 15 wherein the social network content includes analytics generated from execution of the static security analysis tool in association with the set of application development environments.

18. The computer program product as described in claim 17 wherein the analytics includes an analysis of security findings from a project associated with two or more of the application development environments, and recommendations regarding security findings.

19. The computer program product as described in claim 15 wherein the computer program instructions further include computer program instructions to:

collect information about use of the social networking platform; and modify at least one function or characteristic of the social networking platform based on the collected information.

20. The computer program product as described in claim 15 wherein the social network content includes information identifying a third party that is available to provide assistance to a user to facilitate a remediation identified by the static security analysis tool.

21. The computer program product as described in claim 15 wherein at least first and second of the application development environments are associated with different organizations.

* * * * *